(12) United States Patent
Kimura et al.

(10) Patent No.: US 11,473,638 B2
(45) Date of Patent: Oct. 18, 2022

(54) METHOD FOR MANUFACTURING FRICTION MATERIAL

(71) Applicant: NISSHINBO BRAKE, INC., Tokyo (JP)

(72) Inventors: Eiji Kimura, Gunma-Ken (JP); Mitsuaki Yaguchi, Gunma-Ken (JP); Junichi Imai, Gunma-Ken (JP)

(73) Assignee: Nisshinbo Brake, Inc., Tokyo (JP)

( * ) Notice: Subject to any disclaimer, the term of this patent is extended or adjusted under 35 U.S.C. 154(b) by 0 days.

(21) Appl. No.: 17/054,165

(22) PCT Filed: Apr. 26, 2019

(86) PCT No.: PCT/JP2019/017925
§ 371 (c)(1),
(2) Date: Nov. 9, 2020

(87) PCT Pub. No.: WO2019/216265
PCT Pub. Date: Nov. 14, 2019

(65) Prior Publication Data
US 2021/0231185 A1 Jul. 29, 2021

(30) Foreign Application Priority Data
May 11, 2018 (JP) .............................. JP2018-092129

(51) Int. Cl.
*F16D 69/02* (2006.01)
(52) U.S. Cl.
CPC .... *F16D 69/026* (2013.01); *F16D 2200/0073* (2013.01); *F16D 2200/0086* (2013.01)
(58) Field of Classification Search
CPC .......... F16D 69/026; F16D 2200/0073; F16D 2200/0086; F16D 2250/0092; B23K 26/60

USPC ......................................................... 523/156
See application file for complete search history.

(56) References Cited

U.S. PATENT DOCUMENTS

| 5,693,402 A | * | 12/1997 | Chwastiak | ............. F16D 69/00 428/443 |
| 2002/0046789 A1 | * | 4/2002 | Grimme | ................. B29C 71/02 266/87 |

FOREIGN PATENT DOCUMENTS

| EP | 1262679 | 12/2002 |
| JP | 11-269536 | * 10/1999 |

OTHER PUBLICATIONS

Machine translation of JP 11-269536 (Year: 1999).*

* cited by examiner

*Primary Examiner* — Doris L Lee
(74) *Attorney, Agent, or Firm* — Apex Juris PLLC; Tracy M Heims

(57) ABSTRACT

[Object]
To provide the method of manufacturing the friction material that is capable of uniformly scorching into the deep part of the surface layer of the friction material in a short period of time.
[Means to Resolve]
In the method of manufacturing the friction material including the scorching step of scorching the surface of the friction material with the laser, the friction material contains 5 to 25% by weight of one or more types of black materials relative to the total amount of the friction material composition, and the L* of the CIE Lab of the surface of the friction material before scorching is 20 to 60.

12 Claims, 5 Drawing Sheets

METHOD FOR MANUFACTURING FRICTION MATERIAL

TECHNICAL FIELD

The present invention relates to a method of manufacturing a friction material used for a disc brake and a drum brake of automobiles such as a passenger car and a truck.

BACKGROUND OF TECHNOLOGY

Conventionally, a disc brake and a drum brake are used as a brake device of automobiles, and a disc brake pad and a brake shoe, each of which includes a metal base member and a friction material attached thereto, are used as a friction member.

The friction material is manufactured by the following steps: a mixing step for mixing a friction material composition including a binder, a fiber base, a lubricant, an organic friction modifier, an inorganic friction modifier, a pH adjuster, and a filler so as to obtain a raw friction material mixture; a heat-press-forming step for heat-press-forming the raw friction material mixture with a heatforming die; and a heat treatment step for completing curing of a thermosetting resin as binder.

When a temperature of the friction material reaches a high temperature due to frictional contact between the friction material and a metal disc rotor or a brake drum upon braking the automobile, decomposition gas is generated by heating the binder and the organic friction modifier in the friction material. It is known that the existence of decomposition gas between the friction material and the disc rotor or the brake drum causes so-called "brake fade" in which the friction coefficient decreases and the braking effectiveness decreases rapidly.

In order to prevent the brake fade in the initial stage of the use of the friction material, in the process of manufacturing the friction material, an entire frictional surface of the friction material after molding is heated at a high temperature called "scorching" so as to remove organic substances or the like that cause the brake fade by burning the same.

Conventionally, as a method of scorching, a method of pressing a heating plate against the surface of the friction material, and a method of heating the surface of the friction material by direct fire such as gas flame have been used; however, in recent years, methods of heat-treating the surface of the friction material with an infrared laser as disclosed in Patent Document 1 or heat-treating the surface of the friction material with a high-power diode laser as disclosed in Patent Document 2 has been adopted.

PRIOR ART DOCUMENTS

Patent Document
Patent document 1: US2002/046789A
Patent document 2: EP1262679A

SUMMARY OF THE INVENTION

Problems to be Solved

The methods of heat-treating the surface of the friction material with the laser disclosed in Patent document 1 and Patent document 2 are able to shorten the time period of the scorching step as compared to the conventional method of heating the surface of the friction material that heats the surface of the friction material by directly contacting the heat source to the surface thereof; however, there is a need for a method that can scorch uniformly from the surface of the friction material to a deep part of the surface thereof in a short period of time.

The present invention relates to a method of manufacturing a friction material for scorching a surface of a friction material used for a disc brake and a drum brake of an automobile such as a passenger car and a truck with a laser, and an object of the present invention is to provide a method of manufacturing a friction material that can be uniformly scorched into the deep part of a surface layer of the friction material in a short period of time.

Means to Solve Problems

In general, black raw materials such as carbonaceous materials such as a graphite and a coke, a triiron tetraoxide, a black cashew dust manufactured using furfural as a curing agent, and pulverized powders of tire tread rubber may be added as raw materials for a friction material.

As the result that the inventors of the present invention had intensively studied the raw friction materials forcing on the fact that the black raw material tends to absorb the energy of the laser easily among various raw materials contained therein, relating to the method of scorching the surface of the friction material with a laser, the inventors completed this invention by finding that uniform scorching can be performed into the deep part of the surface layer by adding the predetermined amount of one or more types of black raw materials to the friction material and setting the color tone of the surface of the friction material before scorching to the specific range.

The present invention relates to a method of scorching the surface of a friction material used for a disc brake and a drum brake of an automobile such as a passenger car and a truck with a laser and is based on the following technology.

(1) In a method of manufacturing a friction material, which includes a scorching step of scorching the surface of the friction material with a laser, the friction material contains 5 to 25% by weight of one or more types of black raw materials relative to the total amount of the friction material composition, and the L* of the CIE Lab of the surface of the friction material before scorching is 20 to 60.

(2) In the method of manufacturing the friction material according to (1), an energy density of the laser in the scorching is 150 to 2000 kW/m2, a distance between the laser irradiation surface and the surface of the friction material is 15 to 300 mm, and a scorching time is 0.5 to 60 seconds.

(3) In the method of manufacturing the friction material according to (1) or (2), a light source of the laser beam is a vertical cavity surface emitting laser module.

(4) In the method of manufacturing the friction material according to anyone of (1)-(3), a pre-heating step is performed immediately before the scorching step.

(5) In the method of manufacturing the friction material according to (4), the pre-heating step is a heat treatment step.

Effect of the Invention

According to the present invention, in the method of manufacturing the friction material in which the scorching is performed with a laser on the surface of the friction material used for the disc brake and the drum brake of the automobiles such as the passenger car and the truck, it is possible to provide the method of manufacturing the friction material that can provide the uniform scorching in the deep part of the surface layer in a short period of time.

MODE FOR CARRYING OUT THE INVENTION

Figure 1:
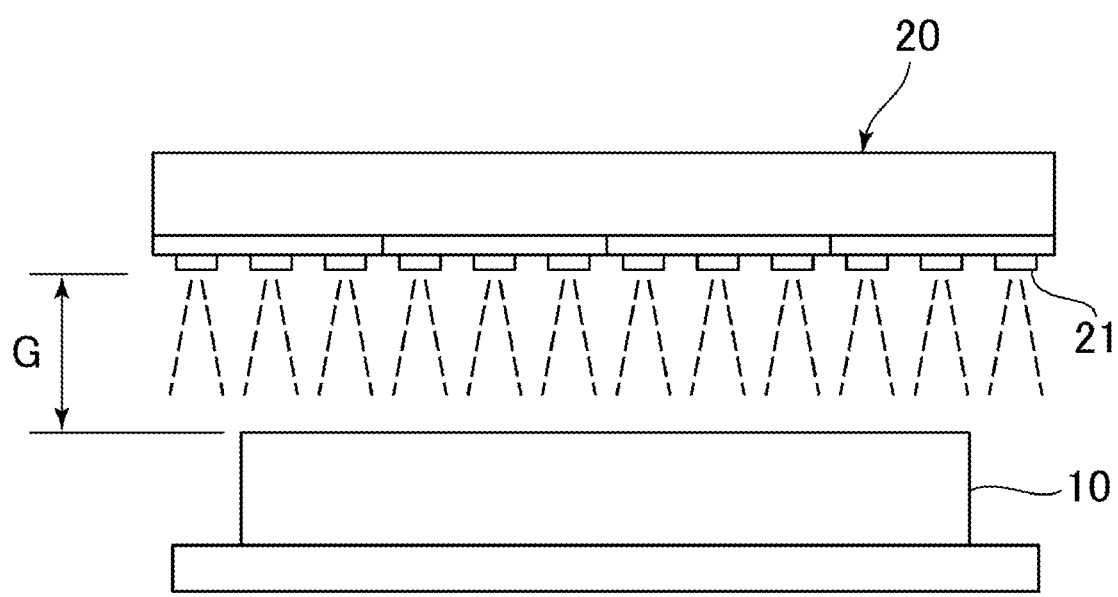
FIG. 1 is a model view of the scorching step for the friction material of the present invention.
Figure 2:
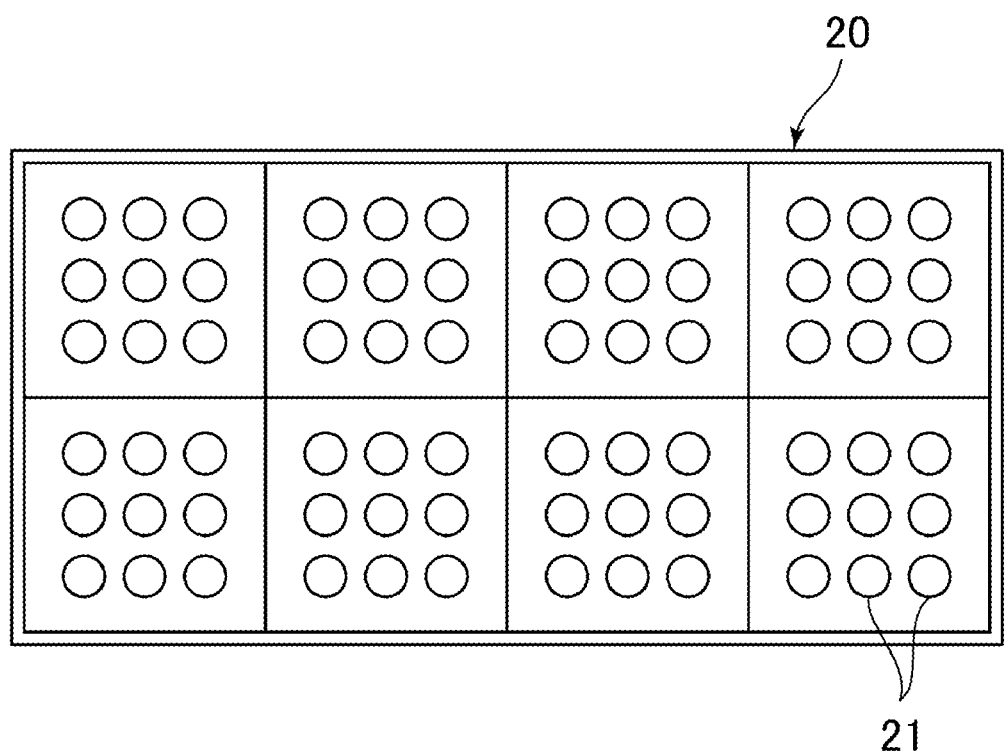
FIG. 2 is a bottom view of the surface emitting laser to be used in the scorching step.

Hereinafter, before describing the method of manufacturing the friction material according to the present invention, the raw materials of the friction material and the CIE Lab of the surface of the friction material will be described in order.

1. Raw Friction Material

As raw materials that structure a friction material composition, the raw materials include such as a binder, a fiber base material, a lubricant, an inorganic friction modifier, an organic friction modifier, a pH adjuster, and a filler and further includes at least a black raw material.

(1) Binder

As binders usually used for the friction materials, binders such as straight phenol resin, resin obtained by modifying phenol resin with various elastomers such as cashew oil, silicone oil, and various elastomer such as acrylic rubber, aralkyl modified phenol resin obtained by reacting phenols, aralkyl ethers and aldehydes, and thermosetting resin obtained by dispersing various elastomers, fluorine polymers and the like in a phenol resin, may be listed, and one or a combination of two or more of the binders can be used.

(2) Fiber Base Material

As fiber base materials, fibers such as a metal fiber, organic fibers such as an aramid fiber and an acrylic fiber, and inorganic fibers such as a carbon fiber, a ceramic fiber, and a rock wool, may be listed, and one or a combination of two or more of the fibers can be used.

(3) Lubricant

As lubricants, lubricants that are usually used for the friction materials such as metal sulfide-based lubricants such as molybdenum disulfide, zinc sulfide, tin sulfide, and composite metal sulfide, and carbonaceous lubricants such as artificial graphite, natural graphite, flaky graphite, activated carbon, pulverized powder of polyacrylonitrile oxide, coke, and elastic graphitized carbon may be listed, and one or a combination of two or more of the lubricants can be used.

(4) Inorganic Friction Modifier

As inorganic friction modifiers, friction modifiers such as particle inorganic friction modifiers such as triiron tetraoxide, calcium silicate hydrate, glass beads, magnesium oxide, zirconium oxide, zirconium silicate, γ-alumina, α-alumina, silicon carbide, flake titanate, platy titanate, columnar titanate, amorphous titanate (titanates are potassium titanate, lithium potassium titanate, magnesium potassium titanate or the like), mica, vermiculite, talc and fibrous inorganic friction modifiers such as wollastonite, sepiolite, basalt fiber, glass fiber, bio-soluble artificial mineral fiber, and rock wool, may be listed, and one or a combination of two or more of the above-friction modifiers can be used.

(5) Organic Friction Modifier

As organic friction modifiers, friction modifiers that are usually used for friction materials such as cashew dust, tire tread rubber pulverized powder, and vulcanized or unvulcanized rubber powder such as, nitrile rubber, acrylic rubber, silicone rubber and butyl rubber may be listed, and one or a combination of two or more of the above-friction modifiers can be used singly or in combination of two or more.

(6) pH Adjuster

As pH adjusters, adjusters usually used for friction materials such as calcium hydroxide can be used.

(7) Filler

As fillers, fillers such as barium sulfate and calcium carbonate may be used as the remainder of the friction material composition.

(8) Black Raw Material

As "black raw materials" materials in a color close to black (dark color) having a property of easily absorbing a laser beam, for example, carbonaceous materials (carbon fiber, artificial graphite, natural graphite, flake graphite, activated carbon, pulverized powder of oxidized polyacrylonitrile fiber, coke, elastic graphitized carbon or the like), molybdenum disulfide, triiron tetraoxide, black cashew dust manufactured using furfural as a curing agent, and a tire tread rubber pulverizing powder may be listed and one or a combination of two or more of the above-black raw materials can be contained in the friction material.

The content of the black raw material is preferably 5 to 25% by weight and is more preferably 10 to 20% by weight, relative to the total amount of the friction material composition.

2. CIE Lab of the Surface of the Friction Material

In the present invention, L* of the CIE Lab of the surface of the friction material before scorching is in the range of 20 to 60.

In the present invention, CIE Lab means values using L*a*b* coordinate of CIE (Commission internationale de l'eclairage).

The CIE Lab can be adjusted appropriately by combining the above-mentioned black raw material and the materials that are usually used in the friction raw material such as the binder, fiber base material, lubricant, inorganic friction modifier, organic friction modifier, pH adjuster, and filler while securing the desired performance.

When a laser is irradiated to the surface of the friction material containing one or more black raw materials and the L* of CIE Lab* of the surface is 20 to 60, energy is efficiently absorbed in the surface of the friction material and the generated heat rapidly propagates in the depth direction from the surface of the friction material, which uniformly scorches from the surface of the friction material to the deep part of the friction material in a short period of time.

3. Method of Manufacturing the Friction Material

Figure 3:
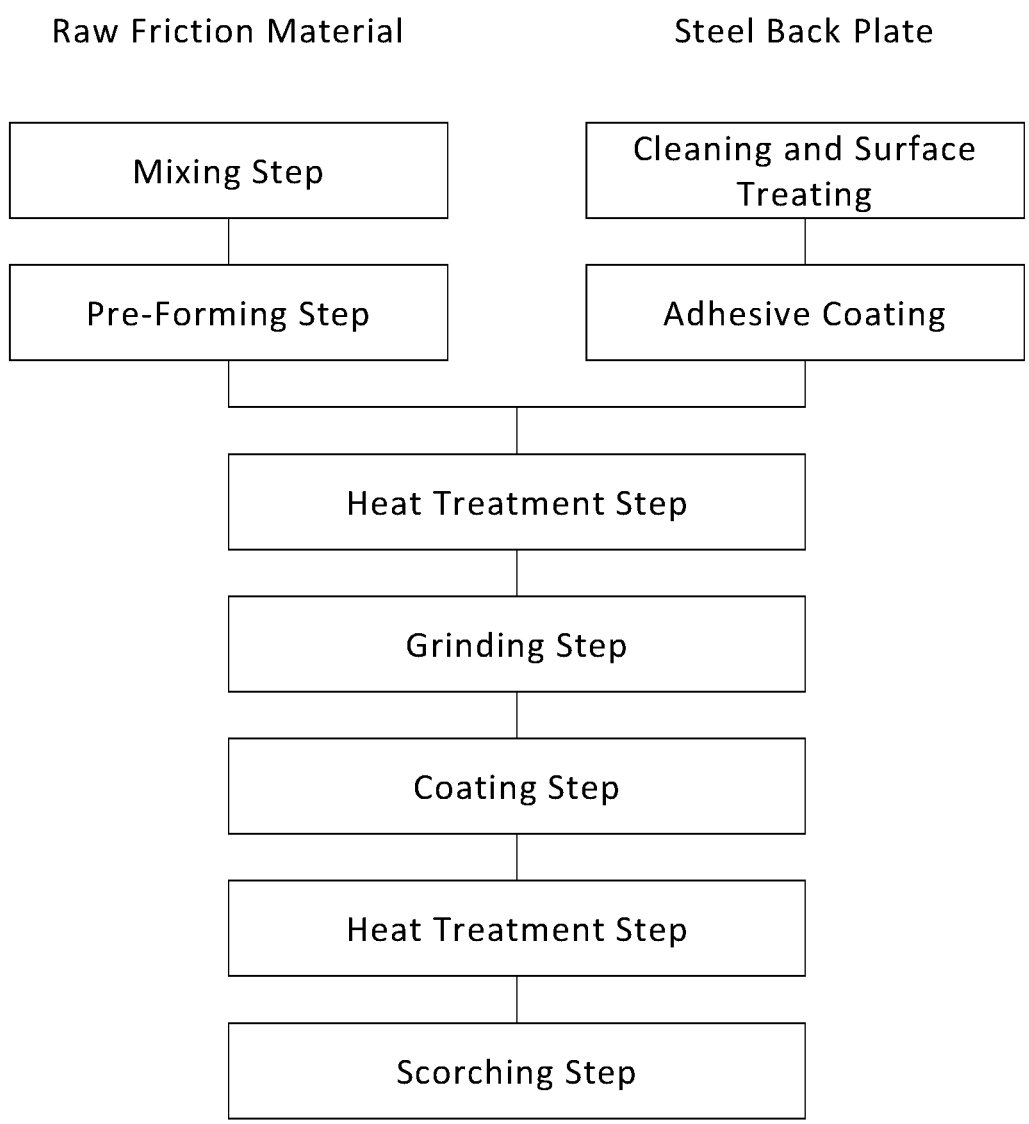
FIG. 3 is a flowchart of one example of the method of manufacturing the friction material of the present invention.

Next, the method of manufacturing the friction material will be described in detail with reference to FIG. 3.

(1) Mixing Step

A friction material composition prepared by blending the predetermined amount of a raw friction material containing at least one type of black raw materials is charged into a mixer such as a Loedige mixer or Eirich mixer and is stirred to be mixed until it is uniformly dispersed to obtain a raw friction material mixture.

(2) Pre-Forming Step

The raw friction material mixture obtained in the mixing step is put into a pre-forming die and is press-formed using a pressing device to obtain a pre-formed product.

Prior to the pre-forming step, a kneading step of kneading the raw friction material mixture with pressurized kneader to obtain a kneaded raw friction material and/or a granulating step of granulating the raw friction material mixture to obtain a granulated raw friction material may be provided.

(3) Heat-Press-Forming Step

The pre-formed product obtained in the pre-forming step is introduced into a heat-forming die and heat-press-formed with the pressing device for 1 to 10 minutes at 140 to 200 degrees Celsius of temperature under 20 to 80 MPa of pressure.

In the case of manufacturing the disc brake pad, the pre-formed product and a cleaned, surface-treated, and adhesive coated steel back plate are stacked and set in a heat press die.

In the case of manufacturing a brake lining for a drum brake, only a preformed product is put in a heat-forming die and is heat-press-formed.

In some cases, the pre-forming step may be omitted, and either the raw friction material mixture, the kneaded raw friction material, or the granulated raw friction material is charged in a heat forming die and heat-press-formed.

(4) Grinding Step and Other Processing Step

The surface of the friction material is ground using a grinding device with a grindstone to form a frictional surface, and a chamfer and/or a slit and/is formed as needed.

(5) Coating Step

When manufacturing the disc brake pad, the paint is coated on the areas of the friction material other than the friction surface of the friction material by spray coating, electrostatic powder coating, or the like.

The baking of the paint is performed simultaneously with the later-described heat treatment step.

(6) Heat Treatment Step The molded article of the friction material is heated in a heat treatment furnace at 180 to 250 degrees Cereus for 1 to 5 hours to complete the curing reaction of the thermosetting resin contained as a binder in the friction material and to simultaneously bake the paint coated in the above-coating step.

(7) Scorching Step

Although the methods disclosed in patent document 1 or patent document 2 may be used for the scorching step, an example of the scorching step using a vertical cavity surface emitting laser module is shown below.

(7.1) Vertical Cavity Surface Emitting Laser Module (VCSEL Module)

The vertical cavity surface emitting laser module is a module in which plural vertical cavity surface emitting laser elements are arranged on one plane and modularized, and for example, it is possible to use the Philips Photonics type of vertical cavity surface emitting laser module which is manufactured using the method mentioned in JP2015-510279T.

The lifetime of the vertical cavity surface emitting laser element is about 19,000 hours, which is longer than the lifetime of the infrared lamp, which is about 5,000 hours, as described in Patent Document 1.

(7.2) Energy Density

The energy density of the surface emitting laser element 21 when the friction material 10 is scorched is 150 to 2000 kW/m 2 and is preferably 300 to 1000 kW/m2 but more preferably 400 to 800 kW/m 2.

If the energy density of the surface emitting laser element 21 is less than 150 kW/m2, the heating temperature will be insufficient, and if it exceeds 2000 kW/m2, the surface of the friction material will be excessively heated to cause cracks on the surface of the friction material.

(7.3) Irradiation Distance

The distance (irradiation distance) G between the irradiation surface of the surface emitting laser element 21 and the surface of the friction material 10 when the friction material is scorched is 15 to 300 mm and is preferably 50 to 200 mm but more preferably 80 to 150 mm.

When the distance G between the irradiation surface of the surface emitting laser element 21 and the surface of the friction material 10 is less than 15 mm, the irradiation range by the surface emitting laser element 21 becomes narrow, and if the distance G between the irradiation surface of the surface emitting laser element 21 and the surface of the friction material 10 exceeds 300 mm, the heating temperature is insufficient.

(7.4) Processing Time

The time for scorching the friction material 10 is 0.5 to 60 seconds and is preferably 3 to 10 seconds but more preferably 4 to 8 seconds.

If the scorching time exceeds 60 seconds, the surface of the friction material 10 is excessively heated, resulting in causing the problem that the wear resistance is reduced.

(7.5) Burn-Off of Black Material

Change of the surface layer of the friction material 10 during the scorching step of irradiating a laser beam from the surface emitting laser 20 to the friction material 10 will be described in detail with reference to FIGS. 4 and 5.

Figure 4:
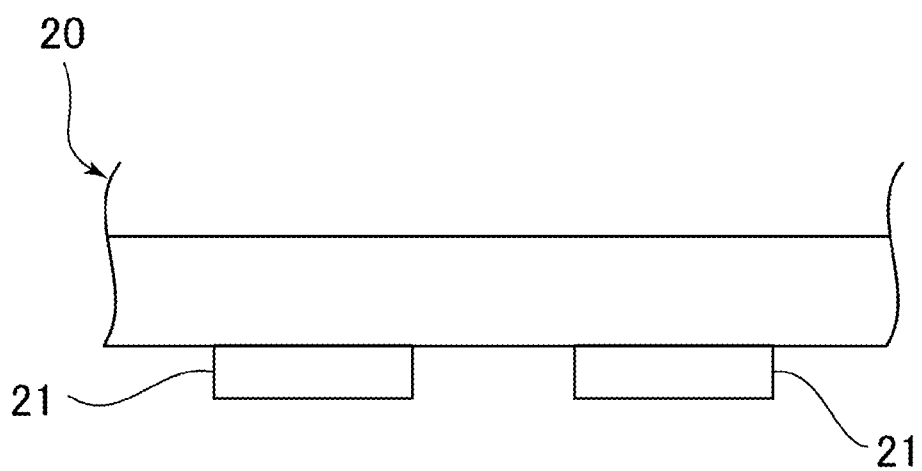
FIG. 4 is a cross-section view of the surface layer of the friction material before scorching with a laser.
Figure 4:
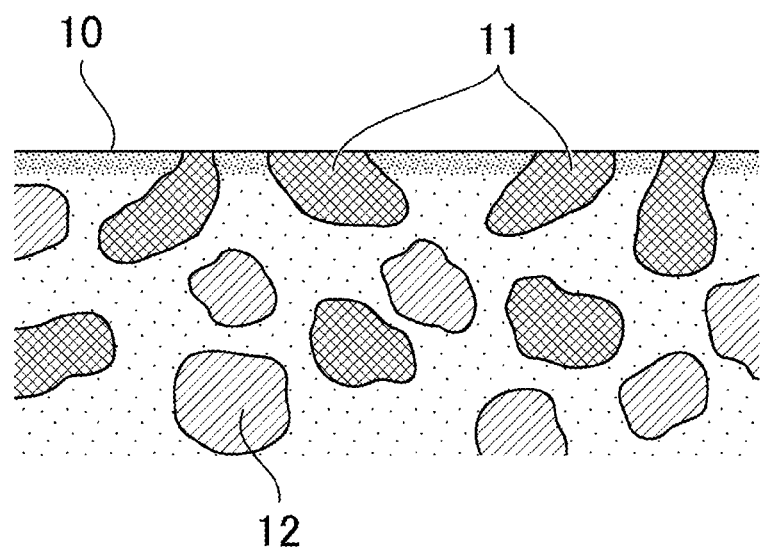
Figure 5:
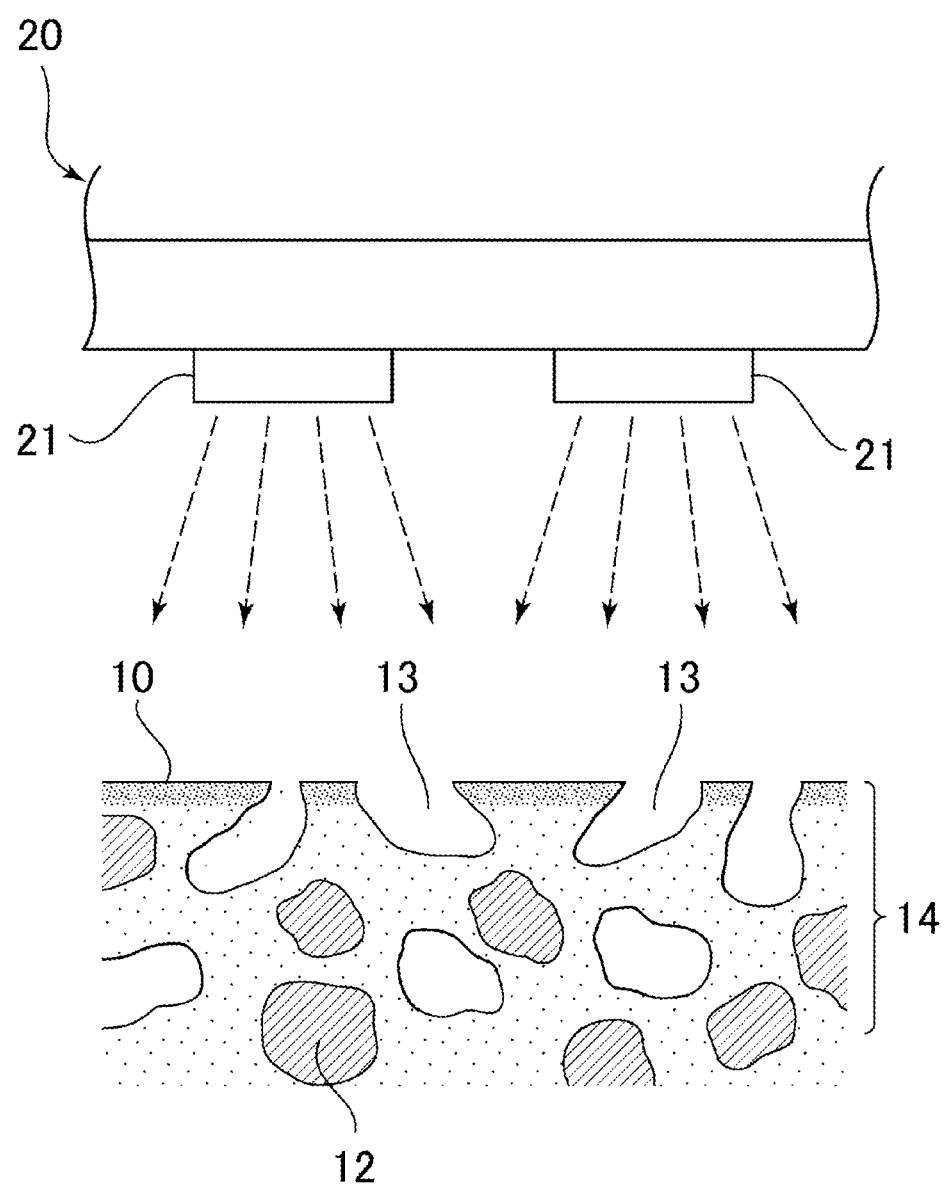
FIG. 5 is a cross-section view of the surface layer of the friction material immediately after the initiation of the scorching with a laser.

FIG. 4 shows the cross section view of the surface layer of the friction material before the initiation of irradiating a laser beam, and FIG. 5 shows the cross section of the surface layer of the friction material 10 immediately after the initiation of irradiating the laser beam.

When the laser beam is irradiated to the surface of the friction material 10, which contains the black raw material 11 and has 20-60 of the L* of CIE Lab at the surface, the laser energy is intensively absorbed by the brake raw material 11 within the raw friction material that is exposed on the surface of the friction material 10, thereby rapidly raising the temperatures of the brake raw material 11 and the surrounding area thereof.

The black raw material 11 is burned off when it is heated to the predetermined temperature.

Although the laser energy is absorbed also in the non-black raw material 12, the non-black raw material 12 is not burned off because it does not reach the heating degree of the black raw material 11.

Since the heating temperature of the black raw material 11 propagates rapidly from the surface of the friction material 10 in the depth direction, it is possible to burn off the black raw material 11 located in the predetermined depth from the surface of the friction material 10 in a short period of time.

Therefore, burning marks of the black raw material 11 remain as pores 13 in the surface layer of the friction material 10, and a scorched layer 14 having a porous structure is formed in the surface layer of the friction material 10.

(7.6) Arrangement of Surface Emitting Lasers

The arrangement of the surface emitting laser 20 with respect to the friction material 10 is not limited to the form in which it is disposed sideways in parallel with the friction material 10 shown in FIG. 1, and the surface emitting laser 20 may be disposed in a V-shaped inclination so as to surround the friction material 10.

(7.7) Relationship Between the Friction Material and Surface Emitting Laser During Scorching Step Regarding the relationship between the friction material 10 and the surface emitting laser 20 during the scorching step, the scorching step may be performed while the friction material 10 disposed opposite to the surface emitting laser 20 is in a stationary state, or any one of the surface emitting laser 20 and the friction material 10 is in a movable state.

For example, when carrying the surface emitting laser 20 against the friction material 10, which is placed on the transporting means, and transporting on or with the transporting means, it is possible to apply a conveyor method of linear conveyance, or a rotary conveyance method of rotating in a circular motion.

(8) Pre-Heating Step

Furthermore, if the pre-heating step of the friction material is provided immediately before the scorching step, the processing time for scorching the friction material can be shortened further.

For the pre-heating step, such as a method of heating with a heating furnace and a method of pressing the surface of the friction material against a heating plate can be adopted, but by providing the scorching step immediately after the above-heat treatment step, a heat treatment step and the pre-heating step can be done at the same time.

Hereinafter, the present invention will be specifically described by showing Embodiments and Comparative Examples, but the present invention is not limited to the following Embodiments.

1. Method of Manufacturing Disc Brake Pads of Embodiments 1 to 23 and Comparative Examples 1 to 5

The friction material compositions having the compositions shown in Table 1 and Table 2 were mixed for 5 minutes with a Loedige mixer and were pre-formed for 10 seconds under 30 MPa in a forming die.

This preformed product is placed on a steel back plate which is cleaned, surface-treated and adhesive-coated, formed in a heat forming die for 10 minutes at 150 degrees Cereus of forming temperature under 40 MPa of forming pressure, electrostatic powder coated, performed the heat treatment (post-cured) which also served as paint baking for 5 hours at 200 degrees Cereus, and ground to form a frictional surface.

Before the scorching step, L* of CIE Lab of the surface of the friction material was measured using a spectrophotometer type color difference meter SE7700 manufactured by Nippon Denshoku Industries Co., Ltd. The measured value used the average value measured 5 times.

Then, the scorching step was performed under the conditions shown in Tables 1 and 2 to produce disc brake pads (Examples 1 to 23, Comparative Examples 1 to 5).

Using the obtained disc brake pad, the product appearance, the abrasion resistance, and the fade resistance were evaluated. The evaluation results are shown in Tables 1 and 2.

TABLE 1

| | | black raw material | Examples | | | | | | | | | Comparative Examples | | |
|---|---|---|---|---|---|---|---|---|---|---|---|---|---|---|
| | | | 1 | 2 | 3 | 4 | 5 | 6 | 7 | 8 | 9 | 1 | 2 | 3 |
| binder | phenol resin | | 12 | 12 | 12 | 12 | 12 | 8 | 8 | 8 | 8 | 15 | 12 | 8 |
| fiber base | aramid fiber | | 4 | 4 | 4 | 4 | 4 | 6 | 6 | 6 | 6 | 4 | 4 | 6 |
| lubricant | zinc sulfide | | 2 | 2 | 2 | 2 | 2 | 3 | 3 | 3 | 3 | 2 | 2 | 3 |
| | artificial graphite | ○ | 1 | 2 | 3 | 3 | 6 | 1 | 2 | 3 | 3 | 1 | 6 | 6 |
| | coke | ○ | | 3 | 3 | 3 | 3 | | 3 | 3 | 3 | | 3 | 3 |
| inorganic friction modifier | platy potassium titanate | | 20 | 20 | 20 | 20 | 20 | 30 | 30 | 30 | 30 | 20 | 20 | 30 |
| | zirconium silicate | | 2 | 2 | 2 | 2 | 2 | 1 | 1 | 1 | 1 | 2 | 2 | 1 |
| | triiron tetraoxide | ○ | | | | 5 | 5 | | | | 5 | | 6 | 5 |
| | mica | | 3 | 3 | 3 | 3 | 3 | 3 | 3 | 3 | 3 | 3 | 3 | 3 |
| | zirconium oxide | | 20 | 20 | 20 | 20 | 20 | 10 | 10 | 10 | 10 | 20 | 20 | 10 |
| organic friction modifier | cashew dust (black) | ○ | 2 | 2 | 5 | 5 | 7 | 2 | 2 | 5 | 5 | 2 | 7 | 7 |
| | tire tread rubber pulverized powder | ○ | 2 | 3 | 4 | 4 | 4 | 2 | 3 | 4 | 4 | 2 | 4 | 4 |
| pH adjuster | calcium hydroxide | | 3 | 3 | 3 | 3 | 3 | 5 | 5 | 5 | 5 | 3 | 3 | 5 |
| filler | barium sulfate | | 29 | 24 | 19 | 14 | 9 | 29 | 24 | 19 | 14 | 26 | 8 | 9 |
| | Total (weight %) | | 100 | 100 | 100 | 100 | 100 | 100 | 110 | 100 | 100 | 100 | 100 | 100 |
| | Total of black raw material (weight %) | | 5 | 10 | 15 | 20 | 25 | 5 | 10 | 15 | 20 | 5 | 25 | 25 |
| | L* of CIE Lab | | 59 | 52 | 41 | 35 | 21 | 50 | 44 | 40 | 32 | 65 | 18 | 19 |
| scorching condition | energy density of the surface emitting laser element (kW/m2) | | 600 | 600 | 600 | 600 | 600 | 600 | 600 | 600 | 600 | 600 | 600 | 600 |
| | Distance between the irradiation surface of the surface emitting laser element and the surface of the friction material (mm) | | 100 | 100 | 100 | 100 | 100 | 100 | 100 | 100 | 100 | 100 | 100 | 100 |
| | scorching time(seconds) | | 5 | 5 | 5 | 5 | 5 | 5 | 5 | 5 | 5 | 5 | 5 | 5 |
| evaluation results | product appearance | | ○ | ○ | ○ | ○ | ○ | ○ | ○ | ○ | ○ | ○ | ○ | ○ |
| | wear resistance | | ◎ | ◎ | ◎ | ○ | Δ | ◎ | ◎ | ◎ | ○ | ◎ | X | X |
| | fade resistance | | Δ | ○ | ◎ | ◎ | ○ | ○ | ◎ | ◎ | ◎ | X | Δ | Δ |

TABLE 2

| | | black raw material | Examples | | | | | | | | |
|---|---|---|---|---|---|---|---|---|---|---|---|
| | | | 10 | 11 | 12 | 13 | 14 | 15 | 16 | 17 | 18 |
| binder | phenol resin | | 12 | 12 | 12 | 12 | 12 | 12 | 12 | 12 | 12 |
| fiber base | aramid fiber | | 4 | 4 | 4 | 4 | 4 | 4 | 4 | 4 | 4 |
| lubricant | zinc sulfide | | 2 | 2 | 2 | 2 | 2 | 2 | 2 | 2 | 2 |
| | artificial graphite | ○ | 3 | 3 | 3 | 3 | 3 | 3 | 3 | 3 | 3 |
| | coke | ○ | 3 | 3 | 3 | 3 | 3 | 3 | 3 | 3 | 3 |

TABLE 2-continued

|  |  |  |  |  |  |  |  |  |  |  |
|---|---|---|---|---|---|---|---|---|---|---|
| inorganic friction modifier | platy potassium titanate |  | 20 | 20 | 20 | 20 | 20 | 20 | 20 | 20 | 20 |
|  | zirconium silicate |  | 2 | 2 | 2 | 2 | 2 | 2 | 2 | 2 | 2 |
|  | triiron tetraoxide | ○ |  |  |  |  |  |  |  |  |  |
|  | mica |  | 3 | 3 | 3 | 3 | 3 | 3 | 3 | 3 | 3 |
|  | zirconium oxide |  | 20 | 20 | 20 | 20 | 20 | 20 | 20 | 20 | 20 |
| organic friction modifier | cashew dust (black) | ○ | 5 | 5 | 5 | 5 | 5 | 5 | 5 | 5 | 5 |
|  | tire tread rubber pulverized powder | ○ | 4 | 4 | 4 | 4 | 4 | 4 | 4 | 4 | 4 |
| pH adjuster | calcium hydroxide |  | 3 | 3 | 3 | 3 | 3 | 3 | 3 | 3 | 3 |
| filler | barium sulfate |  | 19 | 19 | 19 | 19 | 19 | 19 | 19 | 19 | 19 |
|  | Total (weight %) |  | 100 | 100 | 100 | 100 | 100 | 100 | 100 | 100 | 100 |
|  | Total of black raw material (weight %) |  | 15 | 15 | 15 | 15 | 15 | 15 | 15 | 15 | 15 |
|  | L* of CIE Lab |  | 41 | 41 | 41 | 41 | 41 | 41 | 41 | 41 | 41 |
| scorching condition | energy density of the surface emitting laser element (kW/m2) |  | 150 | 300 | 400 | 800 | 1000 | 2000 | 600 | 600 | 600 |
|  | Distance between the irradiation surface of the surface emitting laser element and the surface of the friction material (mm) |  | 100 | 100 | 100 | 100 | 100 | 100 | 15 | 50 | 80 |
|  | scorching time (seconds) |  | 20 | 10 | 8 | 4 | 2 | 0.5 | 0.5 | 3 | 4 |
| evaluation results | product appearance |  | ○ | ○ | ○ | ○ | ○ | ○ | ○ | ○ | ○ |
|  | wear resistance |  | ⊚ | ⊚ | ⊚ | ⊚ | ○ | △ | △ | ○ | ⊚ |
|  | fade resistance |  | ⊚ | ⊚ | ⊚ | ⊚ | ○ | ○ | ○ | ○ | ⊚ |

|  |  | black raw material | Examples | | | | | Comparative Examples | |
|---|---|---|---|---|---|---|---|---|---|
|  |  |  | 19 | 20 | 21 | 22 | 23 | 4 | 5 |
| binder | phenol resin |  | 12 | 12 | 12 | 12 | 12 | 12 | 12 |
| fiber base | aramid fiber |  | 4 | 4 | 4 | 4 | 4 | 4 | 4 |
| lubricant | zinc sulfide |  | 2 | 2 | 2 | 2 | 2 | 2 | 2 |
|  | artificial graphite | ○ | 3 | 3 | 3 | 3 | 3 | 3 | 3 |
|  | coke | ○ | 3 | 3 | 3 | 3 | 3 | 3 | 3 |
| inorganic friction modifier | platy potassium titanate |  | 20 | 20 | 20 | 20 | 20 | 20 | 20 |
|  | zirconium silicate |  | 2 | 2 | 2 | 2 | 2 | 2 | 2 |
|  | triiron tetraoxide | ○ |  |  |  |  |  |  |  |
|  | mica |  | 3 | 3 | 3 | 3 | 3 | 3 | 3 |
|  | zirconium oxide |  | 20 | 20 | 20 | 20 | 20 | 20 | 20 |
| organic friction modifier | cashew dust (black) | ○ | 5 | 5 | 5 | 5 | 5 | 5 | 5 |
|  | tire tread rubber pulverized powder | ○ | 4 | 4 | 4 | 4 | 4 | 4 | 4 |
| pH adjuster | calcium hydroxide |  | 3 | 3 | 3 | 3 | 3 | 3 | 3 |
| filler | barium sulfate |  | 19 | 19 | 19 | 19 | 19 | 19 | 19 |
|  | Total (weight %) |  | 100 | 100 | 100 | 100 | 100 | 100 | 100 |
|  | Total of black raw material (weight %) |  | 15 | 15 | 15 | 15 | 15 | 15 | 15 |
|  | L* of CIE Lab |  | 41 | 41 | 41 | 41 | 41 | 41 | 41 |
| scorching condition | energy density of the surface emitting laser element (kW/m2) |  | 600 | 600 | 600 | 150 | 150 | 800 | 150 |
|  | Distance between the irradiation surface of the surface emitting laser element and the surface of the friction material (mm) |  | 150 | 200 | 300 | 300 | 15 | 10 | 400 |
|  | scorching time (seconds) |  | 8 | 10 | 15 | 60 | 2 | 0.5 | 60 |
| evaluation results | product appearance |  | ○ | ○ | ○ | ○ | ○ | X | ○ |
|  | wear resistance |  | ⊚ | ⊚ | ⊚ | ○ | ⊚ | — | ⊚ |
|  | fade resistance |  | ⊚ | ⊚ | ⊚ | △ | △ | — | X |

2. Evaluation

<1> Product Appearance

The condition of the friction material surface after the scorching was visually confirmed. Evaluation criteria are as follows.
○: no cracks
x: Cracked <2> Wear Resistance According to JASO C427, "Automobile Parts—Brake Lining and Disc Brake Pad—Wear Test Procedure on Inertia Dynamometer", the abrasion amount (mm) of the friction material was measured at initial speed braking of 50 km/h, braking deceleration of 0.3 G, suitable braking frequency, pre-braking temperature of 200 degrees Cereus to evaluate according to the following standard after converting into the wear amount per 1000 braking frequency.

⊚: Less than 0.15 mm
○: more than 0.15 mm and less than 0.20 mm
△: more than 0.20 mm and less than 0.50 mm
x: More than 0.50 mm
-: non-evaluation about a product appearance "X"

<3> Fade Resistance

The minimum friction coefficient μ in the first fade test was measured in accordance with JASO C406 "Passenger car-braking device-Dynamometer test procedures". Evaluation standard are as follows.
⊚: 0.3 or more
○: 0.25 or more but less than 0.30
△: 0.20 or more but less than 0.25
x: Less than 0.20
-: no evaluation because of the product appearance is "X"

As described above, according to the present invention, a method of manufacturing a friction material for scorching the surface of a friction material used for disc brakes and drum brakes of automobiles such as passenger cars and trucks with a laser, it is possible to provide a method of manufacturing a friction material capable of uniformly scorching into the deep part of the surface layer of the friction material in a short period of time.

EXPLANATION OF REFERENCES 10 friction material
11 Black raw friction material
12 Non-black raw friction material
13 Pore of friction material
14 Scorched layer of friction material
20 surface emitting laser
21 Surface emitting laser element

The invention claimed is:

1. A method of manufacturing a friction material including a scorching step of scorching a surface of the friction material with a laser beam, wherein
said friction material comprises 5-25 weight % of one or more types of a black raw materials relative to the total amount of the friction material, and
L* of the CIE Lab of the surface of the friction material before scorching step is 20-60.

2. The method of manufacturing the friction material of claim 1, wherein
a pre-heating step is performed immediately before the scorching step.

3. The method of manufacturing the friction material of claim 2, wherein
the pre-heating step is a heat treatment step.

4. The method of manufacturing the friction material of claim 1, wherein
a light source of the laser beam is a vertical cavity surface emitting laser module.

5. The method of manufacturing the friction material of claim 4, wherein
a pre-heating step is performed immediately before the scorching step.

6. The method of manufacturing the friction material of claim 5, wherein
the pre-heating step is a heat treatment step.

7. The method of manufacturing the friction material of claim 1, wherein
an energy density of the laser beam in the scorching step is 150-2000 kW/m 2,
a distance between the laser beam irradiation surface and the surface of the friction material is 15 to 300 mm, and
a time required for the scorching step is 0.5 to 60 seconds.

8. The method of manufacturing the friction material of claim 7, wherein
a pre-heating step is performed immediately before the scorching step.

9. The method of manufacturing the friction material of claim 8, wherein
the pre-heating step is a heat treatment step.

10. The method of manufacturing the friction material of claim 7, wherein
a light source of the laser beam is a vertical cavity surface emitting laser module.

11. The method of manufacturing the friction material of claim 10, wherein
a pre-heating step is performed immediately before the scorching step.

12. The method of manufacturing the friction material of claim 11, wherein
the pre-heating step is a heat treatment step.

* * * * *